United States Patent [19]

O'Sullivan

[11] 3,742,018

[45] June 26, 1973

[54] CYANOACRYLATE ADHESIVE COMPOSITION

[75] Inventor: Denis Joseph O'Sullivan, Dublin, Ireland

[73] Assignee: Loctite (Ireland) Limited, Dublin, Ireland

[22] Filed: Apr. 14, 1970

[21] Appl. No.: 28,543

Related U.S. Application Data

[63] Continuation-in-part of Ser. No. 771,612, Oct. 29, 1968.

[30] Foreign Application Priority Data

Apr. 15, 1969 Ireland.................................. 501/69
Nov. 10, 1967 Ireland................................ 1347/67
Jan. 5, 1968 Ireland.................................... 17/68

[52] U.S. Cl............. 260/465.4, 260/464, 260/465 D

[51] Int. Cl............... C07c 121/30, C07c 121/48, C07c 121/52

[58] Field of Search..................... 260/465.4, 465 D, 260/464

[56] References Cited

UNITED STATES PATENTS

| | | | |
|---|---|---|---|
| 2,721,858 | 10/1955 | Joyner et al. ................ | 260/465.4 X |
| 2,784,215 | 3/1957 | Joyner ............................. | 260/465.4 |
| 3,355,482 | 11/1967 | Coover, Jr. et al. ......... | 260/465.4 X |

*Primary Examiner*—Joseph P. Brust
*Attorney*—J. Rodney Reck and William J. Daniel

[57] ABSTRACT

Rapidly curing adhesive compositions are composed of monomeric esters of 2-cyanoacrylic acid ($CH_2 = C(CN)CO_2R$), stabilized by an organic sultone ($-CS(O_2)OC-$).

10 Claims, No Drawings

CYANOACRYLATE ADHESIVE COMPOSITION

CROSS REFERENCE TO RELATED APPLICATION

This is a continuation-in-part of copending Pat. application Ser. No. 771,612, filed Oct. 29, 1968.

BACKGROUND OF THE INVENTION

This invention relates to adhesive compositions containing monomeric esters of 2-cyanoacrylic acid, wherein the esters polymerize (cure) after application to the surfaces to be joined, to form an adhesive bond. It is particularly concerned with the chemical stabilization of these esters in the relevant compositions, so as to prevent or retard spurious polymerization and thus enhance shelf life without, however, adversely affecting cure speed during use.

It is known in the prior art that adhesive compositions containing monomeric esters of 2-cyanoacrylic acid can be stabilized by incorporating in the compositions small quantities of an acidic gas, most commonly sulfur dioxide, and a free radical inhibitor, most commonly hydroquinone. This technique is described, for example, in U.S. Pat. Nos. 2,765,332 to Coover et al, issued Oct. 2, 1956, and 2,794,788 to Coover et al, issued June 4, 1957.

In the known methods, sulfur dioxide is added in concentrations within the approximate range 0.001 to 0.01 percent by weight of the adhesive compositions. A greater concentration has an adverse effect in that even a slight excess of sulfur dioxide will cause serious retardation of speed of cure. At a lesser concentration serious stability problems are encountered. The stability problem becomes progressively more acute during the period of use of the adhesive since the acidic gas will volatilize producing a progressively less stable composition. Concentrations of the order discussed above are difficult to obtain with accuracy under the conditions of practical production, and it is also a difficult analytical task to determine with sufficient accuracy the quantity of gaseous stabilizer, such as sulfur dioxide, present in the final adhesive composition. The preparation of monomeric esters of 2-cyanoacrylic acid normally involves a thermal cracking (depolymerization) of the corresponding cyanoacrylate polymer, and it is usual at that stage to add an excess of the inhibiting acidic gas to ensure stability of the hot monomer vapors. The excess gas must be removed by time consuming stripping under high vacuum, during which time periodic determinations of acidic gas content are made until the product eventually achieves the requisite balance of stability and cure speed. Similar remarks apply to the use as principal inhibitor of an acidic gas other than sulfur dioxide, such as nitric oxide or boron trifluoride.

It is therefore an object of the present invention to provide an alternative and improved means of stabilizing monomeric esters of 2-cyanoacrylic acid in adhesive compositions by avoiding the use of critically small quantities of acidic gases.

THE INVENTION

The present invention concerns adhesive compositions which comprise a monomeric ester of 2-cyanoacrylic acid and a sultone stabilizer. Generally, the ester of 2-cyanoacrylic acid corresponds to the general formula

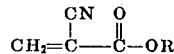

where $R$ is a $C_1$ to about $C_{16}$ alkyl, cyclohexyl or phenyl group. The sultone, a heterocyclic compound containing an

group in the heterocyclic ring, may be either aromatic or aliphatic. Optionally, an inhibitor of free radical polymerization, generally of the phenolic type, can be included in the adhesive composition.

DISCUSSION OF THE INVENTION AND ITS PREFERRED EMBODIMENTS

The esters of 2-cyanoacrylic acid which are used in the invention described herein can be prepared by the method described in U.S. Pat. No. 2,467,927 to Ardis, issued Apr. 19, 1949. This method involves the preparation of an intermediate polymer through the condensation reaction between formaldehyde and an alkyl, cyclohexyl or phenyl ester of cyanoacetic acid. The condensation reaction is promoted by the presence of a basic condensation catalyst, such as ammonium hydroxide, quinoline, piperidine and diethyl amine. Moderate warming, such as to about 50° C to initiate the reaction, also may be desirable. Water and organic solvents are removed, generally by distillation, following which the intermediate polymer is thermally decomposed to produce the monomeric ester of 2-cyanoacrylic acid. The monomeric ester is separated by fractional distillation at a reduced pressure of 1 to 10 millimeters of mercury absolute pressure, or less, generally in the presence of an acidic polymerization inhibitor such as phosphorous pentoxide. The monomer vapors are condensed into a vessel which contains the desired inhibitors for use in the final adhesive product, as disclosed above and discussed more fully below. Other similar manufacturing processes are disclosed, for example, in U.S. Pat. No. 2,721,858 to Joyner et al, issued Oct. 25, 1955, and 3,254,111 to Hawkins et al, issued May 31, 1966.

In the adhesive composition, the esters of 2-cyanoacrylic acid can be used singly or in combination. Preferably, a single ester is used, selected from the group consisting of $C_1$ to $C_5$ alkyl and cyclohexyl esters of 2-cyanoacrylic acid. The single most desirable ester is methyl-2-cyanoacrylate.

The sultones which serve as stabilizers for the adhesives disclosed herein are commerically available from suppliers of chemical specialties. Or, if desired, they may be prepared by the use of known reactions from readily available starting materials. For example, sultones conveniently can be prepared from hydroxysulfonic acids. When the acid is heated to moderately hot temperatures, such as from about 120° C to about 160° C, the sultone is formed by intramolecular condensation wherein a molecule of water is eliminated between the hydroxy and acid groups.

A desirable class of sultones may be represented by the formula

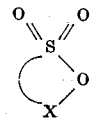

wherein $X$ is a hydrocarbon group joining the —S(O$_2$)O— group in a four, five or six member heterocyclic ring, and preferably a five member heterocyclic ring. Since the presence of the characteristic —S(O$_2$)O— group of the sultone is the critical factor, the hydrocarbon group $X$ can contain any substituents or linkages which do not adversely affect the sultone for use as a stabilizer in the adhesive composition. Most preferably, $X$ may be represented by the formula

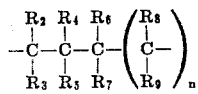

wherein $n$ is either 0 or 1, and each of $R_2$ through $R_9$, inclusive is selected from the group consisting of hydrogen, alkyl or alkenyl of one to about eight carbon atoms, bromo, chloro and hydroxyl groups, and aromatic or fused aromatic rings. Contemplated within this definition are compounds where more than one of $R_2$ through $R_9$, inclusive, and the connecting carbon atoms are joined in aromatic or fused aromatic rings. An example of this type of compound is 1,8-Naphthosultone, which has the formula

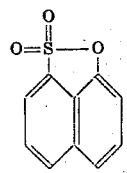

Other typical sultones which exemplify the compounds defined above, and their structural formulae, are as listed below.

| | |
|---|---|
| 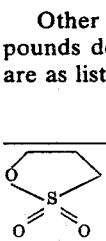 | Propane sultone. |
| 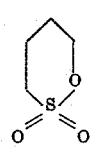 | Butane sultone. |
| 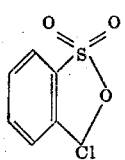 | Monochlorotolyl sultone. |
| 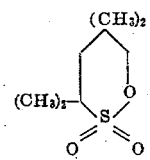 | 3,3,5,5-tetramethylbutane sultone. |
| 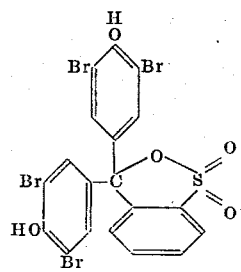 | Bromophenol blue (3,3',5,5' tetrabromophenol sulfonphthalein). |
| 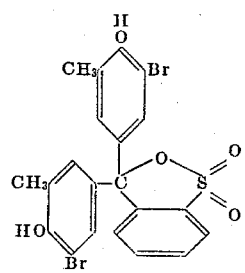 | Bromocresol purple (5,5'-dibromo-o-cresolsulfonephthalein). |
| 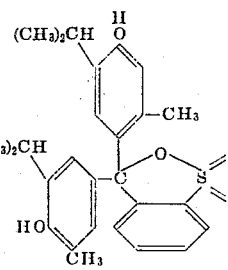 | Thymol blue (thymolsulfonephthalein). |
| 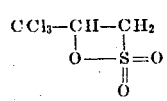 | β-Trichloromethyl-β-ethane sultone. |
| 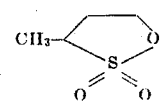 | α-Methylpropane-γ-sultone. |
| 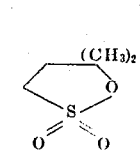 | γ-Dimethylpropane-γ-sultone. |
| 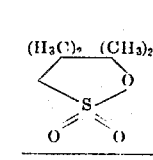 | β-Dimethyl-γ-dimethylpropane-γ-sultone. |

The preferred content of sultone in the adhesive composition should be no more than necessary to prevent spurious polymerization of the adhesive prior to the time of intended use, which generally is between about 0.01 and 2 percent by weight of the final composition. Higher levels, e.g., up to about 10 percent by weight sultone, can be used; however, sultones are acidic by nature and, since cyanoacrylate adhesives are anionically initiated, excess sultone may tend to decelerate the cure of the adhesive at the time of intended use. The highly preferred range is from 0.1 to 2 percent.

An unexpected additional benefit has been found in compositions containing more than 2 percent and up to 10 percent by weight of the sultone. At these higher concentrations, sultones serve as excellent bond plasticizers. Thus, the need for a separate bond plasticizing ingredient is removed, a benefit unachieved in the prior art. Bonds made with adhesive compositions formulated in this new manner are excellently plasticized, as shown by their increased impact breaking strength and an improved resistance to failure after aging, as compared with bonds formed using the simpler adhesive compositions described in the prior application.

In accordance with an additional preferred embodiment of the invention, it also has been found that the extreme speed of cure, which is characteristic of the compositions containing 0.01 to 2 percent sultones, can be provided in the compositions of this invention by incorporating therein a small amount of an organic acid, preferably a carboxylic or organic sulfonic acid. This was quite suprising and unexpected since cyanoacrylate adhesives commonly are believed to cure by an anionic (base-initiated) mechanism.

The organic acid preferably is present in a proportion lying in the range of 0.05 to 1 percent based on the weight of the sultones. The organic acid may be derived from the sultone itself by hydrolysis, but preferably is introduced as a free acid unrelated to the sultone. Examples of preferred acids are cyanoacetic acid and p-toluene sulfonic acid. The optimum use range for p-toluene sulfonic acid is from 0.1 to 0.5 percent by weight of the sultone or sultone mixture used. For cyanoacetic acid, similarly, the optimum range is from 0.2 to 0.7 percent. These figures are approximate, since the exact proportion depends on the particular combination of sultones and acids which is chosen, and it must be determined empirically for each such combination by preparing various adhesive compositions in accordance with the invention, and testing the various properties of interest, such as stability, speed of cure and flexibility of bond.

Other organic acids than those specifically disclosed may be used. While the degree of desirability of any such acid easily can be determined with a minimum of routine testing, as a general rule organic acids containing from two to about 15 carbon atoms are preferred.

Sultones are readily handled and stored in conventional equipment, and do not present the hazards and inherent offensiveness of acidic gases such as sulfurdioxide. The sultones are non-volatile materials and hence are not lost during prolonged storage, particularly when storage is under widely varying temperature conditions. The sultone stabilized systems do not encounter the frequent stability problems which which were encountered with prior art cyanoacrylate adhesive compositions. The sultone stabilized adhesives can be stored in a wider variety of containers and in contact with a wider variety of materials since corrosion problems which are inherent with most acidic gases do not exist with the sultone stabilized system.

Greater speed of cure can be produced with the compositions of this invention. Because of the fact that loss of stabilizer is not a problem, the adhesive composition can be formulated at a somewhat higher pH level than with prior art cyanoacrylate compositions. This means that less inhibiting effect will be present from the stabilizer at the time of use of the adhesive. The common pH range for the compositions of this invention is between about 3 and about 6. A preferred range is between about 4 and about 6.

The net result of the above benefits is that the sultone stabilizers disclosed herein are considerably more reliable and versatile than prior art stabilizers, and can be used to produce adhesive compositions which are both more stable and faster curing than cyanoacrylate adhesives previously.

There are undoubtedly a number of factors which contribute to the effectiveness of the sultones as stabilizers in cyanoacrylate adhesives. While not wishing to be bound to any theory, it is believed the sultones serve as scavengers of Lewis basis which may exist in or enter the adhesive composition. The most common of these is water, residual amounts of which may be present as a result of the manufacturing process. Small amounts of moisture also commonly enter the adhesive container during the period of use of the adhesive. It is believed the sultones react with the water via hydrolysis, and thus remove it as a harmful contaminant in the composition. This may explain why the more ready hydrolizable sultones appear to be the more efficient stabilizers.

While not absolutely necessary, it is generally desirable to include an inhibitor of free radical polymerization in the cyanoacrylate adhesive composition since, like most acrylate type monomers, the cyanoacrylate monomer is subject to attack by free radicals. While many inhibitors of free radical polymerization are known, the most desirable are those of the phenolic type such as quinone, hydroquinone, p-tert-butyl catechol, p-methoxy phenol, 2:6-di-tert-butyl-para cresol and 2,2-methylene-bis-(4-methyl-6-tert-butyl) phenol. These inhibitors may be used at concentrations from about 0.001 to about 1 percent by weight of the adhesive composition. Most preferably, they are used in the range of about 0.005 percent to about 0.1 percent by weight of the adhesive composition.

It is frequently beneficial to incorporate certain other ingredients in the adhesive composition to impart specific characteristics to the adhesive or the cured adhesive product. For example, it is generally desirable to use a thickener to make the adhesive composition more viscous (such as about 25 to about 150 centipoise), and thus capable of retention on the parts to be bonded. Without such thickeners, the adhesive may drain from the part prior to the cure. A number of such thickeners are known for use in combination with cyanoacrylate adhesives, the most common of which are acrylate resins such as polymethylmethacrylate and polyethylmethacrylate. Other suitable thickeners include polymeric alkylcyanoacrylates, cellulose esters such as cellulose acetate and cellulose butyrate, and polyvinyl ethers such as polyvinylmethyl ether.

Additional plasticizers frequently are added to these compositions. The most common of these plasticizers are $C_1$ to $C_{10}$ alkyl esters of dibasic acids such as sebacic acid and malonic acid. Other plasticizers such as polyalkylethers and polyurethanes also may be used.

The above described additives to the combination of cyanoacrylate monomers and sultone stabilizers may be used in any amount which does not adversely affect the composition for its intended use. Generally, plasticizers and thickeners are each used in the range of about 1 percent to about 10 percent by weight of the adhesive composition, the volatile solvent from 0 percent to about 25 percent or more by weight of the adhesive composition, and all of the other named additives at a total of less than about 1 percent by weight of the adhesive composition.

The above described adhesive compositions are shelf-stable items of commerce which may be sold in bulk or consumer-sized containers. It may be safely stored in most glass, plastic or metal containers for periods of three months or more at room temperature, and most frequently for at least nine months or more at room temperature without adverse effect. They may be prepared by simple mixing of the monomeric ester and the sulfone stabilizer. Most other additives can be dissolved or dispersed also with moderate mixing. Generally, if the monomeric ester is made via distillation of the monomer, as described above, the best practice is to measure the sultone and the inhibitor of free radical polymerization, if used, directly into the container in which the condensed monomeric ester will be collected. In this way, the ester is stabilized immediately to prevent the possibility of repolymerization.

EXAMPLES

The following Examples are given to demonstrate the preparation and use of adhesive compositions within the scope of the invention disclosed herein, and are not intended to be limitations upon the invention. Unless stated to the contrary, all ratios and percentages in the Examples are on a weight basis.

EXAMPLE I

Methyl-2-cyanoacrylate was synthesized by allowing methyl-2-cyanoacetate to react with formaldehyde under base-catalytic conditions to form the methyl-2cyanoacrylate polymer. In anticipation of the depolymerization step, phosphorus pentoxide and hydroquinone were added to the reaction mixture to inhibit repolymerization during this subsequent stage of processing. These inhibitors were mixed-in as thoroughly as the viscous nature of the reaction mixture permitted.

The reaction solvents and water were removed by evaporation under vacuum, and the mixture was then liquified by heating it to about 130° C. After blending the mixture thoroughly for 30 to 45 minutes, the polymer was cracked by heating the mixture to the range 160° –220° C under a vacuum of about one millimeter of mercury absolute, and the resulting monomer, which is a liquid resembling water in appearance, and which freezes at about 0.5° C, was collected in a refrigerated container and frozen solid as collected.

The monomeric product was melted by gentle warming. Phosphorus pentoxide and hydroquinone were added, dissolved and thoroughly mixed therein, and the mixture was redistilled under a vacuum of about one millimeter of mercury absolute and at temperature range of about 40° to 50° C. The distillate was collected in a vessel containing sufficient propane sultone and hydroquinone to constitute approximately 0.5 percent and 0.01 percent by weight, respectively, of the collected cyanoacrylate monomer. The pH value of the composition was measured, and adjusted to a value of approximately 4 by adding a minor amount of propane sultone.

The resulting fluid composition was found to be an effective, stabilized adhesive in the following tests. A drop of the composition was applied to the cut end of a 3/16 inch diameter cord of "Buna N" rubber. A second cut end was applied to the treated end, and the two ends held pressed face to face by hand for about 15 seconds, and allowed to cure for a further 15 seconds without pressure. The resulting joint had a breaking strength under tension of 67 lbs. weight, indicating a bond strength of greater than 600 p.s.i.

A quantity of the composition was incubated in a sealed container at 70° C for 45 hours, after which it was cooled to room temperature and a further joint was formed by repeating the joining procedure described above. The new joint had an immediate breaking strength under tension of 67 lbs. of weight. The composition had suffered no measurable loss in adhesive strength in consequence of the above described accelerated storage to which it has been subjected, which was the equivalent of approximately 1 to 2 months at room temperature.

The adhesive composition then was tested for long-term stability by placing a sample of it in an oven at 55° C for 40 days, (approximately equivalent to one year at room temperature). The adhesive composition remained a clear liquid, and when used in the tests described above, was found to produce strong and rapid bonds between the cut ends of the rubber cord.

The methyl-2-cyanoacrylate adhesive composition described in this Example also was found to be an excellent adhesive for bonding glass, metals, wood and plastics.

EXAMPLE II

An adheisve composition was prepared by adding hydroquinone and 0.5 percent monochlorotolyl sultone to methyl-2-cyanoacrylate. The adhesive composition produced strong and rapid bonds between the cut ends of rubber cord when tested in the manner described in Example I, above. Further, the composition had excellent stability as shown by the fact that the composition, when placed in an oven at 55° C, remained clear and fluid for over 100 days. When tested after 100 days, the adhesive still produced strong, rapid bonds in the test of Example I.

When in the above Example, the methyl-2cyanoacrylate is replaced in whole or in part by a $C_2$ through $C_{16}$ alkyl, phenyl or cyclohexyl ester of cyanoacrylic acid, or a mixture thereof, substantially similar results are obtained in that adhesive compositions are produced which are stable at room temperature for a minimum of three months, and which produce strong, rapid bonds on rubber, metal and numerous other surfaces.

EXAMPLE III 0.5% by weight bromophenol blue was added to monomeric methyl-2-cyanoacrylate containing 0.01% hydroquinone to form an adhesive composition. This composition was stable for over 20 days when maintained at 55° C. Stability at room temperature was over 6 months. When used to bond the ends of rubber cord in the test described in Example I, strong, rapid bonds were formed with both the freshly made adhesive, and with the adhesive that had been stored at 55° C.

EXAMPLE IV

An adhesive composition containing 490% by weight of methyl-2-cyanoacrylate monomer stabilized with 0.7% by weight of propane sultone and 0.002% of p-tert-butylcatechol, 4% (approximately) of polymethyl methacrylate as a thickener and 6.0% by weight of propane sultone as plasticizer together with 0.2% of p-toluene sulfonic acid was used to bond various glass, metal and rubber objects. Bonds were effected in seconds and those bonds had excellent tensile strength and showed no tendency to brittleness on aging. The adhesive composition gave a heat accelerated aging test which indicated a shelf life of greater than 5 years.

EXAMPLE V

An adhesive composition containing 92% by weight of methyl-2-cyanoacrylate stabilized with 0.5% by weight of propane sultone and 0.005% by weight of p-tert-butyl catechol, 4% of polymethylmethacrylate as thickener and approximately 4% of propane sultone as plasticizer together with 0.02% of cyanoacetic acid was used to bond various glass, metal and rubber objects. Bonds were effected in seconds and these bonds were of excellent tensile strength and showed no tendency to brittleness on aging. Heat accelerated aging tests indicated a shelf life for the adhesive composition in excess of 5 years.

When, in the above Example, the bromophenyl blue is replaced in whole or in part by 1,8-naphtho sultone, butane sultone or 3,3',5,5'-tetramethylbutane sultone, the total quantity of sultone or sultones being sufficient to produce a pH of about 4, substantially similar results are obtained in that adhesive compositions are produced which are stable at room temperature and which produce strong, rapid bonds on rubber, metal and numerous other surfaces.

I claim:

1. A cyanoacrylate adhesive consisting essentially of at least one monomeric ester of the formula

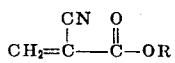

wherein R is a $C_1$ to $C_{16}$ alkyl, cyclohexyl or phenyl group, and from about 0.01 percent to about 10 percent by weight of the adhesive of at least one sultone of the formula

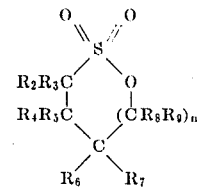

wherein n is 0 or 1 and each of $R_2$ through $R_9$, inclusive, is selected from the group consisting of hydrogen, alkyl or alkenyl of one to about eight carbon atoms, bromo, chloro and hydroxyl groups, and aromatic or fused aromatic rings.

2. The composition of claim 1 wherein the sultone comprises from about 0.1 percent to about 2 percent by weight of the adhesive composition.

3. The composition of claim 1 wherein R is selected from $C_1$ to $C_5$ alkyl and cyclohexyl groups.

4. The composition of claim 3 wherein sufficient sultone is present to produce a pH in the adhesive composition between about 3 and about 6.

5. The composition of claim 3, additionally containing an inhibitor of free radical polymerization.

6. The composition of claim 2 wherein R is selected from $C_1$ to $C_5$ alkyl and cyclohexyl groups.

7. The composition of claim 2, additionally containing between 0.001 percent and 1.0% by weight hydroquinone.

8. The composition of claim 1 having a viscosity between about 25 and 150 centipoise.

9. The composition of claim 1 wherein the monomeric ester is methyl-2-cyanoacrylate and the sultone is propane sultone.

10. The composition of claim 3 wherein the sultone is selected from the class consisting of propane sultone; 1,8-naphthosultone; monochlorotolyl sultone; and 3,3',5,5'-tetrabromophenol sulfonephthalein.

* * * * *